(12) United States Patent
Werner et al.

(10) Patent No.: US 10,978,082 B2
(45) Date of Patent: Apr. 13, 2021

(54) TIME DOMAIN ALIASING REDUCTION FOR NON-UNIFORM FILTERBANKS WHICH USE SPECTRAL ANALYSIS FOLLOWED BY PARTIAL SYNTHESIS

(71) Applicant: Fraunhofer-Gesellschaft zur Foerderung der angewandten Forschung e.V., Munich (DE)

(72) Inventors: Nils Werner, Erlangen (DE); Bernd Edler, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 58 days.

(21) Appl. No.: 16/252,069

(22) Filed: Jan. 18, 2019

(65) Prior Publication Data

US 2019/0172471 A1   Jun. 6, 2019

Related U.S. Application Data

(63) Continuation of application No. PCT/EP2017/068932, filed on Jul. 26, 2017.

(30) Foreign Application Priority Data

Jul. 29, 2016   (EP) .................................... 16181883

(51) Int. Cl.
*G10L 19/00*   (2013.01)
*G10L 19/02*   (2013.01)
(Continued)

(52) U.S. Cl.
CPC ........ *G10L 19/0204* (2013.01); *G06F 17/147* (2013.01); *G10L 19/022* (2013.01); *G10L 19/0212* (2013.01)

(58) Field of Classification Search
USPC .................................. 704/200–232, 500–504
See application file for complete search history.

(56) References Cited

U.S. PATENT DOCUMENTS 6,496,795 B1   12/2002   Malvar
7,460,993 B2 *  12/2008   Chen ...................... G10L 19/02
                                                        704/200.1
(Continued)

FOREIGN PATENT DOCUMENTS

EP   2479750 B1   3/2014
EP   2144171 B1   5/2018
(Continued)

OTHER PUBLICATIONS

Yoon et al. "A Practical Approach for the Design of Nonuniform Lapped Transforms". IEEE Signal Processing Letters, vol. 13 No. 8, Aug. 2006 (Year: 2006).*

(Continued)

*Primary Examiner* — Jesse S Pullias
(74) *Attorney, Agent, or Firm* — Michael A. Glenn; Perkins Coie LLP

(57) ABSTRACT

An audio processor for processing an audio signal to acquire a subband representation thereof includes a cascaded lapped critically sampled transform stage and a time domain aliasing reduction stage, the former being configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal. The latter is configured to perform a weighted combination of two corresponding sets of subband samples, which are acquired on the basis of the first and second blocks of samples of the (Continued)

audio signal, respectively, to acquire an aliasing reduced subband representation of the audio signal.

10 Claims, 11 Drawing Sheets

(51) Int. Cl.
*G06F 17/14* (2006.01)
*G10L 19/022* (2013.01)

(56) References Cited

U.S. PATENT DOCUMENTS

| | | | |
|---|---|---|---|
| 7,546,240 B2* | 6/2009 | Mehrotra | G10L 19/0212 704/203 |
| 7,548,853 B2 | 6/2009 | Shmunk et al. | |
| 7,761,290 B2* | 7/2010 | Koishida | G10L 19/0208 704/222 |
| 2002/0176353 A1 | 11/2002 | Atlas et al. | |
| 2006/0210180 A1 | 9/2006 | Geiger et al. | |
| 2007/0063877 A1 | 3/2007 | Shmunk et al. | |
| 2009/0012797 A1 | 1/2009 | Boehm et al. | |
| 2011/0173009 A1 | 7/2011 | Fuchs et al. | |
| 2012/0128162 A1 | 5/2012 | Chen et al. | |
| 2013/0151262 A1 | 6/2013 | Lohwasser et al. | |
| 2013/0238343 A1 | 9/2013 | Schnell et al. | |

FOREIGN PATENT DOCUMENTS

| | | |
|---|---|---|
| JP | 2008310327 A | 12/2008 |
| JP | 2008547043 A | 12/2008 |
| KR | 20060054472 A | 5/2006 |
| KR | 20110040823 A | 4/2011 |
| KR | 20130055657 A | 5/2013 |
| WO | 2005/083682 A1 | 9/2005 |
| WO | 2008/071353 A2 | 6/2008 |

OTHER PUBLICATIONS

Camberlein, Ewen et al., "Adaptive filter banks using fixed size mdct and subband merging for audio coding-comparison with the mpeg aac filter banks", in Audio Engineering Society Convention 121, Oct. 2006.

Derrien, Olivier et al., "A quasi-orthogonal, invertible, and perceptually relevant time-frequency transform for audio coding", in EUSIPCO, Nice, France, Aug. 2015.

Edler, Von B. "Codierung von Audiosignalen mit überlappender Transformation and adaptiven Fensterfunktionen", Frequenz, vol. 43, Sep. 1989, pp. 252-256.

Mau, Joel et al., "Time-varying orthogonal filter banks without transient filters", in Proceedings of the Acoustics, Speech, and Signal Processing, 1995. On International Conference—vol. 02, Washington, DC, USA, 1995, ICASSP '95, IEEE Computer Society, 1995, pp. 1328-1331.

Necciari, T et al., "The erblet transform: An auditory-based time-frequency representation with perfect reconstruction", in Acoustics, Speech and Signal Processing (ICASSP), 2013 IEEE International Conference on, May 2013, May 2013, pp. 498-502.

Niamut, O.A. et al., "Flexible frequency decompositions for cosine-modulated filter banks", in Acoustics, Speech, and Signal Processing, 2003. Proceedings. (ICASSP '03). 2003 IEEE International Conference on, Apr. 2003, vol. 5, Apr. 2003, pp. V-449-52.

Niamut, Omar A. et al., "Subband merging in cosine-modulated filter banks", Signal Processing Letters, IEEE, vol. 10, No. 4, Apr. 2003, pp. 111-114.

Princen, J.P. et al., "Subband/transform coding using filter bank designs based on time domain aliasing cancellation", in Acoustics, Speech, and Signal Processing, IEEE International Conference on ICASSP '87. vol. 12, Apr. 1987, pp. 2161-2164.

Purat, Marcus et al., "A New Orthonormal Wavelet Packet Decomposition for Audio Coding Using Frequency-Varying Modulated Lapped Transforms", Institut fur Fernmeldetechnik, Technische Universitat Berlin, 1995, pp. 1-4.

Shlien, Seymour, "The modulated Lapped Transform, Its Time-Varying Forms, and Its Applications to Audio Coding Standards", IEEE Transactions on Speech and Audio Processing; vol. 5; No. 4; Jul. 1, 1997; XP011054261, Jul. 1, 1997.

Smart, Greg et al., "Filter Bank Design Based on Time Domain Aliasing Cancellation with Non-Identical Windows", Proceedings of the International Conference on Acoustics, Speech and Signal Processing (ICASSP); vol. 3; XP000529912, Apr. 19, 1994, pp. III-185.

Taswell, Carl, "Empirical Tests for Evaluation of Multirate Filter Bank Parameters", Computational Toolsmiths, Chapter 1, pp. 1-29, 2001.

Valin, Jean-Marc et al., "High-quality, low-delay music coding in the opus codec", in Audio Engineering Society Convention 135, Oct. 2013, Oct. 2013.

Bosi, Marina , et al., ISO/IEC MPEG-2 advanced audio coding. Journal of the Audio engineering society, 1997, vol. 45. No. 10, pp. 789-814., 1997.

\* cited by examiner

300

┌─────────────────────────────────────────────────┐
│ Performing a cascaded lap critically sampled transform on at least
│ two partially overlapping blocks of samples of the audio signal,
│ to obtain a set of subband samples on the basis of a first block of  — 302
│ samples of the audio signal, and to obtain a corresponding set
│ of subband samples on the basis of a second block of samples
│ of the audio signal
└─────────────────────────────────────────────────┘
                          ↓
┌─────────────────────────────────────────────────┐
│ Performing a weighted combination of two corresponding sets of
│ subband samples, one obtained on the basis of the first block
│ of samples of the audio signal and one obtained on the basis      — 304
│ on the second block of samples of the audio signal, to obtain an
│ aliasing reduced subband representation of the audio signal.
└─────────────────────────────────────────────────┘

┌─────────────────────────────────────────────────┐
│ Performing a weighted [and shifted] combination of two
│ corresponding aliasing reduced subband representations of the      — 402
│ audio signal, to obtain an aliased subband representation, wherein
│ the aliased subband representation is a set of subband samples
└─────────────────────────────────────────────────┘
                          ↓
┌─────────────────────────────────────────────────┐
│ Performing a cascaded inverse lap critically sampled transform
│ on the set of subband samples, to obtain a set of samples          — 404
│ associated with a block of samples of the audio signal.
└─────────────────────────────────────────────────┘

Fig. 11

TIME DOMAIN ALIASING REDUCTION FOR NON-UNIFORM FILTERBANKS WHICH USE SPECTRAL ANALYSIS FOLLOWED BY PARTIAL SYNTHESIS

CROSS-REFERENCE TO RELATED APPLICATIONS

This application is a continuation of copending International Application No. PCT/EP2017/068932, filed Jul. 26, 2017, which is incorporated herein by reference in its entirety, and additionally claims priority from European Application No. EP 16181883.6, filed Jul. 29, 2016, which is incorporated herein by reference in its entirety.

BACKGROUND OF THE INVENTION

Embodiments relate to an audio processor/method for processing an audio signal to obtain a subband representation of the audio signal. Further embodiments relate to an audio processor/method for processing a subband representation of an audio signal to obtain the audio signal. Some embodiments relate to time domain aliasing reduction in subbands of non-uniform orthogonal filterbanks based on MDCT (MDCT=modified discrete cosine transform) analysis/synthesis, e.g., in subbands of non-uniform orthogonal MDCT filterbanks.

MDCT is widely used in audio coding applications due to its properties like good energy compaction and orthogonality when used in a lapped fashion. However, MDCT exhibits a uniform time-frequency resolution [J. Princen, A. Johnson, and A. Bradley, "Subband/transform coding using filter bank designs based on time domain aliasing cancellation," in Acoustics, Speech, and Signal Processing, IEEE International Conference on ICASSP '87, April 1987, vol. 12, pp. 2161-2164]. When doing perceptually motivated audio processing, however, a non-uniform time-frequency resolution may be a more desirable representation.

One way of designing a non-uniform transform is the repeated application of one of several uniform transforms.

For subband merging first a long transform is applied, transforming the signal from the temporal to the spectral domain. The result is a spectrum with high spectral but low temporal resolution. Afterwards several spectral bins are transformed back to the temporal domain. This increases the temporal resolution while sacrificing spectral resolution in that selected subband.

Subband splitting is the complementary operation: First a short transform is applied. The result is a spectrum with low spectral but high temporal resolution. Afterwards, the spectral bins of two or more adjacent transform frames are transformed again, increasing their spectral resolution at the cost of temporal resolution.

These steps can be mixed and repeated at will. The choice of transform can be arbitrary, however the same or a similar transforms for each step is usually chosen.

There exist numerous ways of facilitating non-uniform time-frequency transforms:

Using two consecutive fast Fourier transforms, there exists the ERBLet transform, a subband merging transform with an ERB frequency scale [T. Necciari, P. Balazs, N. Holighaus, and P. L. Sondergaard, "The erblet transform: An auditory-based time-frequency representation with perfect reconstruction," in Acoustics, Speech and Signal Processing (ICASSP), 2013 IEEE International Conference on, May 2013, pp. 498-502]. Recently, the same authors expanded their approach to a discrete cosine transform type 4 (DCT4) spectrum and a MDCT subband merging transform [Olivier Derrien, Thibaud Necciari, and Peter Balazs, "A quasi-orthogonal, invertible, and perceptually relevant time-frequency transform for audio coding," in EUSIPCO, Nice, France, August 2015].

However, both approaches were designed to involve very long, overlapping transform windows with non-critical sampling or even transforming the entire signal in one step. These long transform windows and non-critical sampling prohibit precise time-localization in the transform domain and make them unsuitable for coding applications due to a large look ahead and high redundancy.

A subband merging technique using MDCT and butterfly elements to combine selected coefficients of one MDCT frame were introduced in [J. Mau, J. Valot, and D. Minaud, "Time-varying orthogonal filter banks without transient filters," in Proceedings of the Acoustics, Speech, and Signal Processing, 1995. On International Conference—Volume 02, Washington, D.C., USA, 1995, ICASSP '95, pp. 1328-1331, IEEE Computer Society] and generalized to Hadamard matrices in [O. A. Niamut and R. Heusdens, "Flexible frequency decompositions for cosine-modulated filter banks," in Acoustics, Speech, and Signal Processing, 2003. Proceedings. (ICASSP '03). 2003 IEEE International Conference on, April 2003, vol. 5, pp. V-449-52 vol. 5].

The complementary subband splitting operation was introduced in [Jean-Marc Valin, Gregory Maxwell, Timothy B. Terriberry, and Koen Vos, "High-quality, low-delay music coding in the opus codec," in Audio Engineering Society Convention 135, October 2013].

While allowing direct integration into common lapped MDCT transform pipelines, these Butterfly- and Hadamard-based implementations only allow for very limited frequency scale designs with for example sizes constrained to $k=2^n$ with $n \in \mathbb{N}$. Additionally, the Hadamard matrix only very roughly approximates the DCT and thus allows for only very limited tempo-spectral-resolution, as will be described in more detail below.

Additionally, while some of these methods use MDCT they do not try to reduce the resulting aliasing in the subbands, producing a smeared temporal compactness of the resulting filterbank impulse.

SUMMARY

According to an embodiment, an audio processor for processing an audio signal to obtain a subband representation of the audio signal may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein the cascaded lapped critically sampled transform stage includes a first lapped critically sampled transform stage configured to perform lapped critically sampled transforms on a first block of samples and a second block of samples of the at least two partially overlapping blocks of samples of the audio signal, to obtain a first set of bins for the first block of samples and a second set of bins for the second block of samples; wherein the cascaded lapped critically sampled transform stage further includes a second lapped critically sampled transform stage configured to perform a lapped critically sampled transform on a segment of the first set of bins and to perform a lapped critically sampled transform on a segment of the second set of bins, each segment being associated with a subband of the audio signal, to obtain a set of subband samples for the first set of bins and a set of subband samples for the second set of bins; wherein a first set of subband samples is a result of a first lapped critically sampled transform on the basis of the first segment of the first set of bins, wherein a second set of subband samples is a result of a second lapped critically sampled transform on the basis of the second segment of the first set of bins, wherein a third set of subband samples is a result of a third lapped critically sampled transform on the basis of the first segment of the second set of bins, wherein a fourth set of subband samples is a result of a fourth lapped critically sampled transform on the basis of the second segment of the second set of bins; and wherein the time domain aliasing reduction stage is configured to perform a weighted combination of the first set of subband samples and the third set of subband samples, to obtain a first aliasing reduced subband representation of the audio signal, wherein the time domain aliasing reduction stage is configured to perform a weighted combination of the second set of subband samples and the fourth set of subband samples, to obtain a second aliasing reduced subband representation of the audio signal.

According to another embodiment, an audio processor for processing an audio signal to obtain a subband representation of the audio signal may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein the cascaded lapped critically sampled transform stage is configured to segment a set of bins obtained on the basis of the first block of samples using at least two window functions, and to obtain at least two segmented sets of subband samples based on the segmented set of bins corresponding to the first block of samples; wherein the cascaded lapped critically sampled transform stage is configured to segment a set of bins obtained on the basis of the second block of samples using the at least two window functions, and to obtain at least two segmented sets of subband samples based on the segmented set of bins corresponding to the second block of samples; and wherein the at least two window functions exhibit different window widths.

According to another embodiment, an audio processor for processing an audio signal to obtain a subband representation of the audio signal may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein the cascaded lapped critically sampled transform stage is configured to segment a set of bins obtained on the basis of the first block of samples using at least two window functions, and to obtain at least two segmented sets of subband samples based on the segmented set of bins corresponding to the first block of samples; wherein the cascaded lapped critically sampled transform stage is configured to segment a set of bins obtained on the basis of the second block of samples using the at least two window functions, and to obtain at least two sets of subband samples based on the segmented set of bins corresponding to the second block of samples; and wherein filter slopes of the window functions corresponding to adjacent sets of subband samples are symmetric.

According to another embodiment, an audio processor for processing a subband representation of an audio signal to obtain the audio signal may have: an inverse time domain aliasing reduction stage configured to perform a weighted combination of two corresponding aliasing reduced subband representations of the audio signal, to obtain an aliased subband representation, wherein the aliased subband representation is a set of subband samples; and a cascaded inverse lapped critically sampled transform stage configured to perform a cascaded inverse lapped critically sampled transform on the set of subband samples, to obtain a set of samples associated with a block of samples of the audio signal; wherein the cascaded inverse lapped critically sampled transform stage includes a first inverse lapped critically sampled transform stage configured to perform an inverse lapped critically sampled transform on the set of subband samples, to obtain a set of bins associated with a given subband of the audio signal; and a first overlap and add stage configured to perform a concatenation of sets of bins associated with a plurality of subbands of the audio signal, which includes a weighted combination of the set of bins associated with the given subband of the audio signal with a set of bins associated with another subband of the audio signal, to obtain a set) of bins associated with a block of samples of the audio signal.

According to another embodiment, an audio encoder may have: an inventive audio processor; an encoder configured to encode the aliasing reduced subband representation of the audio signal, to obtain an encoded aliasing reduced subband representation of the audio signal; and a bitstream former configured to form a bitstream from the encoded aliasing reduced subband representation of the audio signal.

According to another embodiment, an audio decoder may have: a bitstream parser configured to parse the bitstream, to obtain the encoded aliasing reduced subband representation; a decoder configured to decode the encoded aliasing reduced subband representation, to obtain the aliasing reduced subband representation of the audio signal; and an inventive audio processor.

According to another embodiment, an audio analyzer may have: an inventive audio processor; and an information extractor, configured to analyze the aliasing reduced subband representation, to provide an information describing the audio signal.

According to another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing the cascaded lapped critically sampled transform includes performing lapped critically sampled transforms on a first block of samples and a second block of samples of the at least two partially overlapping blocks of samples of the audio signal, to obtain a first set of bins for the first block of samples and a second set of bins for the second block of samples; wherein performing the cascaded lapped critically sampled transform includes performing a lapped critically sampled transform on a segment of the first set of bins and performing a lapped critically sampled transform on a segment of the second set of bins, each segment being associated with a subband of the audio signal, to obtain a set of subband samples for the first set of bins and a set of subband samples for the second set of bins; wherein a first set of subband samples is a result of a first lapped critically sampled transform on the basis of the first segment of the first set of bins, wherein a second set of subband samples is a result of a second lapped critically sampled transform on the basis of the second segment of the first set of bins, wherein a third set of subband samples is a result of a third lapped critically sampled transform on the basis of the first segment of the second set of bins, wherein a fourth set of subband samples is a result of a fourth lapped critically sampled transform on the basis of the second segment of the second set of bins; and wherein performing the weighted combination of two corresponding sets of subband samples includes performing a weighted combination of the first set of subband samples and the third set of subband samples, to obtain a first aliasing reduced subband representation of the audio signal, wherein the time domain aliasing reduction stage is configured to perform a weighted combination of the second set of subband samples and the fourth set of subband samples, to obtain a second aliasing reduced subband representation of the audio signal.

According to another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing the cascaded lapped critically sampled transform includes segmenting a set of bins obtained on the basis of the first block of samples using at least two window functions, and obtaining at least two segmented sets of subband samples based on the segmented set of bins corresponding to the first block of samples; wherein performing the cascaded lapped critically sampled transform includes segmenting a set of bins obtained on the basis of the second block of samples using the at least two window functions, and obtaining at least two segmented sets of subband samples based on the segmented set of bins corresponding to the second block of samples; and wherein the at least two window functions exhibit different window widths.

According to another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing the cascaded lapped critically sampled transform includes segmenting a set of bins obtained on the basis of the first block of samples using at least two window functions, and obtaining at least two segmented sets of subband samples based on the segmented set of bins corresponding to the first block of samples; wherein performing the cascaded lapped critically sampled transform includes segmenting a set of bins obtained on the basis of the second block of samples using the at least two window functions, and obtaining at least two sets of subband samples based on the segmented set of bins corresponding to the second block of samples; and wherein filter slopes of the window functions corresponding to adjacent sets of subband samples are symmetric.

According to another embodiment, a method for processing a subband representation of an audio signal to obtain the audio signal may have the steps of: performing a weighted combination of two corresponding aliasing reduced subband representations of the audio signal, to obtain an aliased subband representation, wherein the aliased subband representation is a set of subband samples; and performing a cascaded inverse lapped critically sampled transform on the set of subband samples, to obtain a set of samples associated with a block of samples of the audio signal; wherein performing the cascaded inverse lapped critically sampled transform includes performing an inverse lapped critically sampled transform on the set of subband samples, to obtain a set of bins associated with a given subband of the audio signal; and wherein performing the cascaded inverse lapped critically sampled transform includes performing a concatenation of sets of bins associated with a plurality of subbands of the audio signal, which includes a weighted combination of the set of bins associated with the given subband of the audio signal with a set of bins associated with another subband of the audio signal, to obtain a set of bins associated with a block of samples of the audio signal.

According to another embodiment, a non-transitory digital storage medium may have a computer program stored thereon to perform the inventive methods when said computer program is run by a computer.

Embodiments provide an audio processor for processing an audio signal to obtain a subband representation of the audio signal. The audio processor comprises a cascaded lapped critically sampled transform stage and a time domain aliasing reduction stage. The cascaded lapped critically sampled transform stage is configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. The time domain aliasing reduction stage is configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal.

Further embodiments provide an audio processor for processing a subband representation of an audio signal to obtain the audio signal. The audio processor comprises an inverse time domain aliasing reduction stage and a cascaded inverse lapped critically sampled transform stage. The inverse time domain aliasing reduction stage is configured to perform a weighted (and shifted) combination of two corresponding aliasing reduced subband representations (of different blocks of partially overlapping samples) of the audio signal, to obtain an aliased subband representation, wherein the aliased subband representation is a set of subband samples. The cascaded inverse lapped critically sampled transform stage is configured to perform a cascaded inverse lapped critically sampled transform on the set of subband samples, to obtain a set of samples associated with a block of samples of the audio signal.

According to the concept of the present invention, an additional post-processing stage is added to the lapped critically sampled transform (e.g., MDCT) pipeline, the additional post-processing stage comprising another lapped critically sampled transform (e.g., MDCT) along the frequency axis and a time domain aliasing reduction along each subband time axis. This allows extracting arbitrary frequency scales from the lapped critically sampled transform (e.g., MDCT) spectrogram with an improved temporal compactness of the impulse response, while introducing no additional redundancy and a reduced lapped critically sampled transform frame delay.

Further embodiments provide a method for processing an audio signal to obtain a subband representation of the audio signal. The method comprises
performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and
performing a weighted combination of two corresponding sets of subband samples, one obtained on the basis of the first block of samples of the audio signal and one obtained on the basis on the second block of samples of the audio signal, to obtain an aliasing reduced subband representation of the audio signal.

Further embodiments provide a method for processing a subband representation of an audio signal to obtain the audio signal. The method comprises:
performing a weighted (and shifted) combination of two corresponding aliasing reduced subband representations (of different blocks of partially overlapping samples) of the audio signal, to obtain an aliased subband representation, wherein the aliased subband representation is a set of subband samples; and
performing a cascaded inverse lapped critically sampled transform on the set of subband samples, to obtain a set of samples associated with a block of samples of the audio signal.

Subsequently, advantageous implementations of the audio processor for processing an audio signal to obtain a subband representation of the audio signal will be described.

In embodiments, the cascaded lapped critically sampled transform stage can be a cascaded MDCT (MDCT=modified discrete cosine transform), MDST (MDST=modified discrete sine transform) or MLT (MLT=modulated lapped transform) stage.

In embodiments, the cascaded lapped critically sampled transform stage can comprise a first lapped critically sampled transform stage configured to perform lapped critically sampled transforms on a first block of samples and a second block of samples of the at least two partially overlapping blocks of samples of the audio signal, to obtain a first set of bins for the first block of samples and a second set of bins (lapped critically sampled coefficients) for the second block of samples.

The first lapped critically sampled transform stage can be a first MDCT, MDST or MLT stage.

The cascaded lapped critically sampled transform stage can further comprise a second lapped critically sampled transform stage configured to perform a lapped critically sampled transform on a segment (proper subset) of the first set of bins and to perform a lapped critically sampled transform on a segment (proper subset) of the second set of bins, each segment being associated with a subband of the audio signal, to obtain a set of subband samples for the first set of bins and a set of subband samples for the second set of bins.

The second lapped critically sampled transform stage can be a second MDCT, MDST or MLT stage.

Thereby, the first and second lapped critically sampled transform stages can be of the same type, i.e. one out of MDCT, MDST or MLT stages.

In embodiments, the second lapped critically sampled transform stage can be configured to perform lapped critically sampled transforms on at least two partially overlapping segments (proper subsets) of the first set of bins and to perform lapped critically sampled transforms on at least two partially overlapping segments (proper subsets) of the second set of bins, each segment being associated with a subband of the audio signal, to obtain at least two sets of subband samples for the first set of bins and at least two sets of subband samples for the second set of bins.

Thereby, the first set of subband samples can be a result of a first lapped critically sampled transform on the basis of the first segment of the first set of bins, wherein a second set of subband samples can be a result of a second lapped critically sampled transform on the basis of the second segment of the first set of bins, wherein a third set of subband samples can be a result of a third lapped critically sampled transform on the basis of the first segment of the second set of bins, wherein a fourth set of subband samples can be a result of a fourth lapped critically sampled transform on the basis of the second segment of the second set of bins. The time domain aliasing reduction stage can be configured to perform a weighted combination of the first set of subband samples and the third set of subband samples, to obtain a first aliasing reduced subband representation of the audio signal, and to perform a weighted combination of the second set of subband samples and the fourth set of subband samples, to obtain a second aliasing reduced subband representation of the audio signal.

In embodiments, the cascaded lapped critically sampled transform stage can be configured to segment a set of bins obtained on the basis of the first block of samples using at least two window functions and to obtain at least two sets of subband samples based on the segmented set of bins corresponding to the first block of samples, wherein the cascaded lapped critically sampled transform stage can be configured to segment a set of bins obtained on the basis of the second block of samples using the at least two window functions and to obtain at least two sets of subband samples based on the segmented set of bins corresponding to the second block of samples, wherein the at least two window functions comprise different window width.

In embodiments, the cascaded lapped critically sampled transform stage can be configured to segment a set of bins obtained on the basis of the first block of samples using at least two window functions and to obtain at least two sets of subband samples based on the segmented set of bins corresponding to the first block of samples, wherein the cascaded lapped critically sampled transform stage can be configured to segment a set of bins obtained on the basis of the second block of samples using the at least two window functions and to obtain at least two sets of subband samples based on the segmented set of bins corresponding to the second block of samples, wherein filter slopes of the window functions corresponding to adjacent sets of subband samples are symmetric.

In embodiments, the cascaded lapped critically sampled transform stage can be configured to segment the samples of the audio signal into the first block of samples and the second block of samples using a first window function, wherein the lapped critically sampled transform stage can be configured to segment a set of bins obtained on the basis of the first block of samples and a set of bins obtained on the basis of the second block of samples using a second window function, to obtain the corresponding subband samples, wherein the first window function and the second window function comprise different window width.

In embodiments, the cascaded lapped critically sampled transform stage can be configured to segment the samples of the audio signal into the first block of samples and the second block of samples using a first window function, wherein the lapped critically sampled transform stage can be configured to segment a set of bins obtained on the basis of the first block of samples and a set of bins obtained on the basis of the second block of samples using a second window function, to obtain the corresponding subband samples, wherein a window width of the first window function and a window width of the second window function are different from each other, wherein the window width of the first window function and the window width of the second window function differ from each other by a factor different from a power of two.

Subsequently, advantageous implementations of the audio processor for processing a subband representation of an audio signal to obtain the audio signal are described.

In embodiments, the inverse cascaded lapped critically sampled transform stage can be an inverse cascaded MDCT (MDCT=modified discrete cosine transform), MDST (MDST=modified discrete sine transform) or MLT (MLT=modulated lapped transform) stage.

In embodiments, the cascaded inverse lapped critically sampled transform stage can comprise a first inverse lapped critically sampled transform configured to perform an inverse lapped critically sampled transform on the set of subband samples, to obtain a set of bins associated with a given subband of the audio signal.

The first inverse lapped critically sampled transform stage can be a first inverse MDCT, MDST or MLT stage.

In embodiments, the cascaded inverse lapped critically sampled transform stage can comprise a first overlap and add stage configured to perform a concatenation of a set of bins associated with a plurality of subbands of the audio signal, which comprises a weighted combination of the set of bins associated with the given subband of the audio signal with a set of bins associated with another subband of the audio signal, to obtain a set of bins associated with a block of samples of the audio signal.

In embodiments, the cascaded inverse lapped critically sampled transform stage can comprise a second inverse lapped critically sampled transform stage configured to perform an inverse lapped critically sampled transform on the set of bins associated with the block of samples of the audio signal, to obtain a set of samples associated with the block of samples of the audio signal.

The second inverse lapped critically sampled transform stage can be a second inverse MDCT, MDST or MLT stage.

Thereby, the first and second inverse lapped critically sampled transform stages can be of the same type, i.e. one out of inverse MDCT, MDST or MLT stages.

In embodiments, the cascaded inverse lapped critically sampled transform stage can comprise a second overlap and add stage configured to overlap and add the set of samples associated with the block of samples of the audio signal and another set of samples associated with another block of samples of the audio signal, the block of samples and the another block of samples of the audio signal partially overlapping, to obtain the audio signal.

BRIEF DESCRIPTION OF THE DRAWINGS

Embodiments of the present invention will be detailed subsequently referring to the appended drawings, in which:

FIG. 10 shows a flowchart of a method for processing an audio signal to obtain a subband representation of the audio signal, according to an embodiment;

FIG. 11 shows a flowchart of a method for processing a subband representation of an audio signal to obtain the audio signal, according to an embodiment;

DETAILED DESCRIPTION OF THE INVENTION

Figure 1:
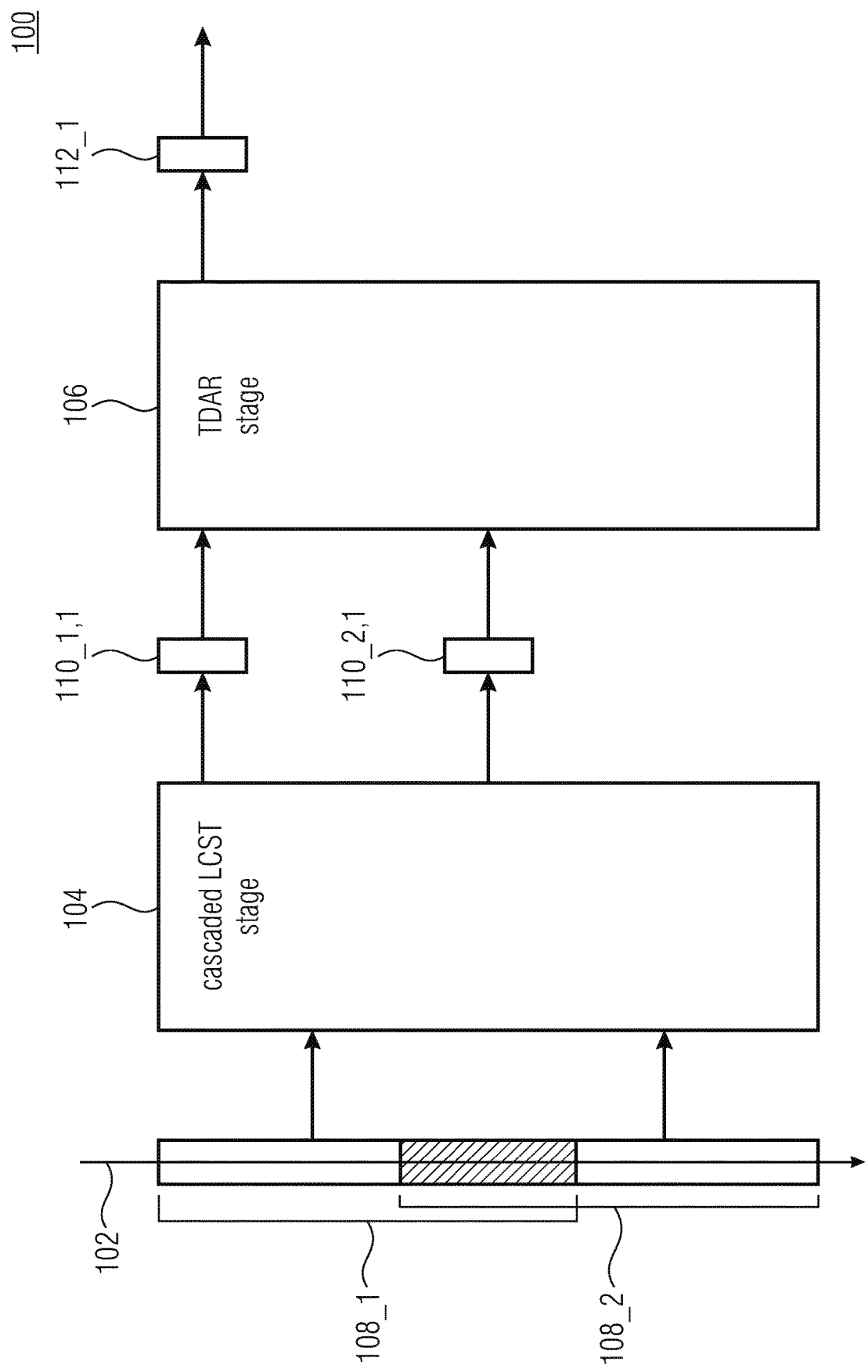
FIG. 1 shows a schematic block diagram of an audio processor configured to process an audio signal to obtain a subband representation of the audio signal, according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of an audio processor 100 configured to process an audio signal 102 to obtain a subband representation of the audio signal, according to an embodiment. The audio processor 100 comprises a cascaded lapped critically sampled transform (LCST) stage 104 and a time domain aliasing reduction (TDAR) stage 106.

The cascaded lapped critically sampled transform stage 104 is configured to perform a cascaded lapped critically sampled transform on at least two partially overlapping blocks 108_1 and 108_2 of samples of the audio signal 102, to obtain a set 110_1,1 of subband samples on the basis of a first block 108_1 of samples (of the at least two overlapping blocks 108_1 and 108_2 of samples) of the audio signal 102, and to obtain a corresponding set 110_2,1 of subband samples on the basis of a second block 108_2 of samples (of the at least two overlapping blocks 108_1 and 108_2 of samples) of the audio signal 102.

The time domain aliasing reduction stage 104 is configured to perform a weighted combination of two corresponding sets 110_1,1 and 110_2,1 of subband samples (i.e., subband samples corresponding to the same subband), one obtained on the basis of the first block 108_1 of samples of the audio signal 102 and one obtained on the basis of the second block 108_2 of samples of the audio signal, to obtain an aliasing reduced subband representation 112_1 of the audio signal 102.

In embodiments, the cascaded lapped critically sampled transform stage 104 can comprise at least two cascaded lapped critically sampled transform stages, or in other words, two lapped critically sampled transform stages connected in a cascaded manner.

The cascaded lapped critically sampled transform stage can be a cascaded MDCT (MDCT=modified discrete cosine transform) stage. The cascaded MDCT stage can comprise at least two MDCT stages.

Naturally, the cascaded lapped critically sampled transform stage also can be a cascaded MDST (MDST=modified discrete sine transform) or MLT (MLT=modulated lap transform) stage, comprising at least two MDST or MLT stages, respectively.

The two corresponding sets of subband samples 110_1,1 and 110_2,1 can be subband samples corresponding to the same subband (i.e. frequency band).

Figure 2:
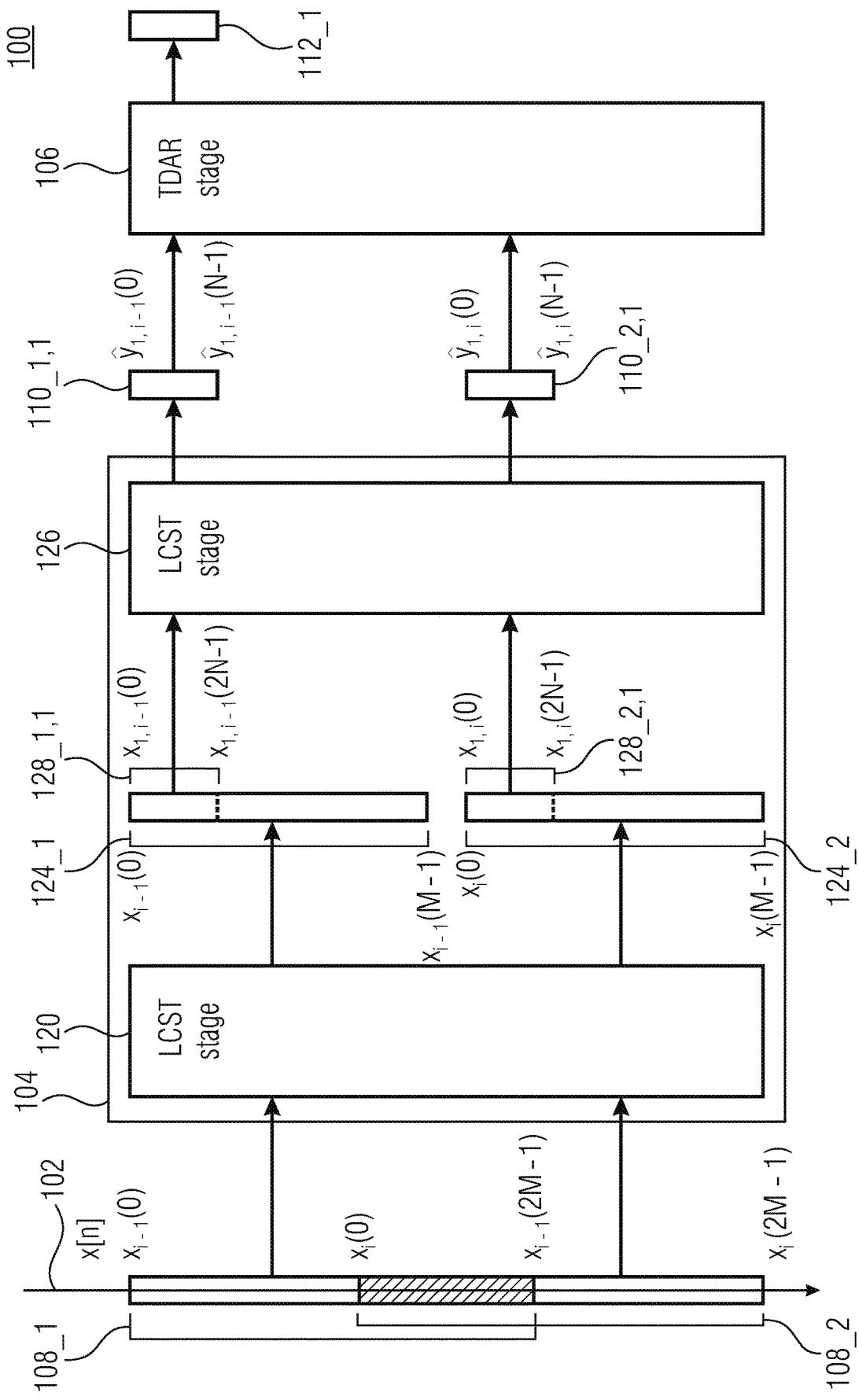
FIG. 2 shows a schematic block diagram of an audio processor configured to process an audio signal to obtain a subband representation of the audio signal, according to a further embodiment.

FIG. 2 shows a schematic block diagram of an audio processor 100 configured to process an audio signal 102 to obtain a subband representation of the audio signal, according to a further embodiment.

As shown in FIG. 2, the cascaded lapped critically sampled transform stage 104 can comprise a first lapped critically sampled transform stage 120 configured to perform lapped critically sampled transforms on a first block 108_1 of (2M) samples ($x_{i-1}(n)$, $0 \leq n \leq 2M-1$) and a second block 108_2 of (2M) samples ($x_i(n)$, $0 \leq n \leq 2M-1$) of the at least two partially overlapping blocks 108_1 and 108_2 of samples of the audio signal 102, to obtain a first set 124_1 of (M) bins (LCST coefficients) ($X_{i-1}(k)$, $0 \leq k \leq M-1$) for the first block 108_1 of samples and a second set 124_2 of (M) bins (LCST coefficients) (Xi(k), $0 \leq k \leq M-1$) for the second block 108_2 of samples.

The cascaded lapped critically sampled transform stage 104 can comprise a second lapped critically sampled transform stage 126 configured to perform a lapped critically sampled transform on a segment 128-1,1 (proper subset) ($X_{v,i-1}(k)$) of the first set 124_1 of bins and to perform a lapped critically sampled transform on a segment 128_2,1 (proper subset) ($X_{v,i}(k)$) of the second set 124_2 of bins, each segment being associated with a subband of the audio signal 102, to obtain a set 110_1,1 of subband samples [$\hat{y}_{v,i-1}(m)$] for the first set 124_1 of bins and a set 110_2,1 of subband samples ($\hat{y}_{v,i}(m)$) for the second set 124_2 of bins.

Figure 3:
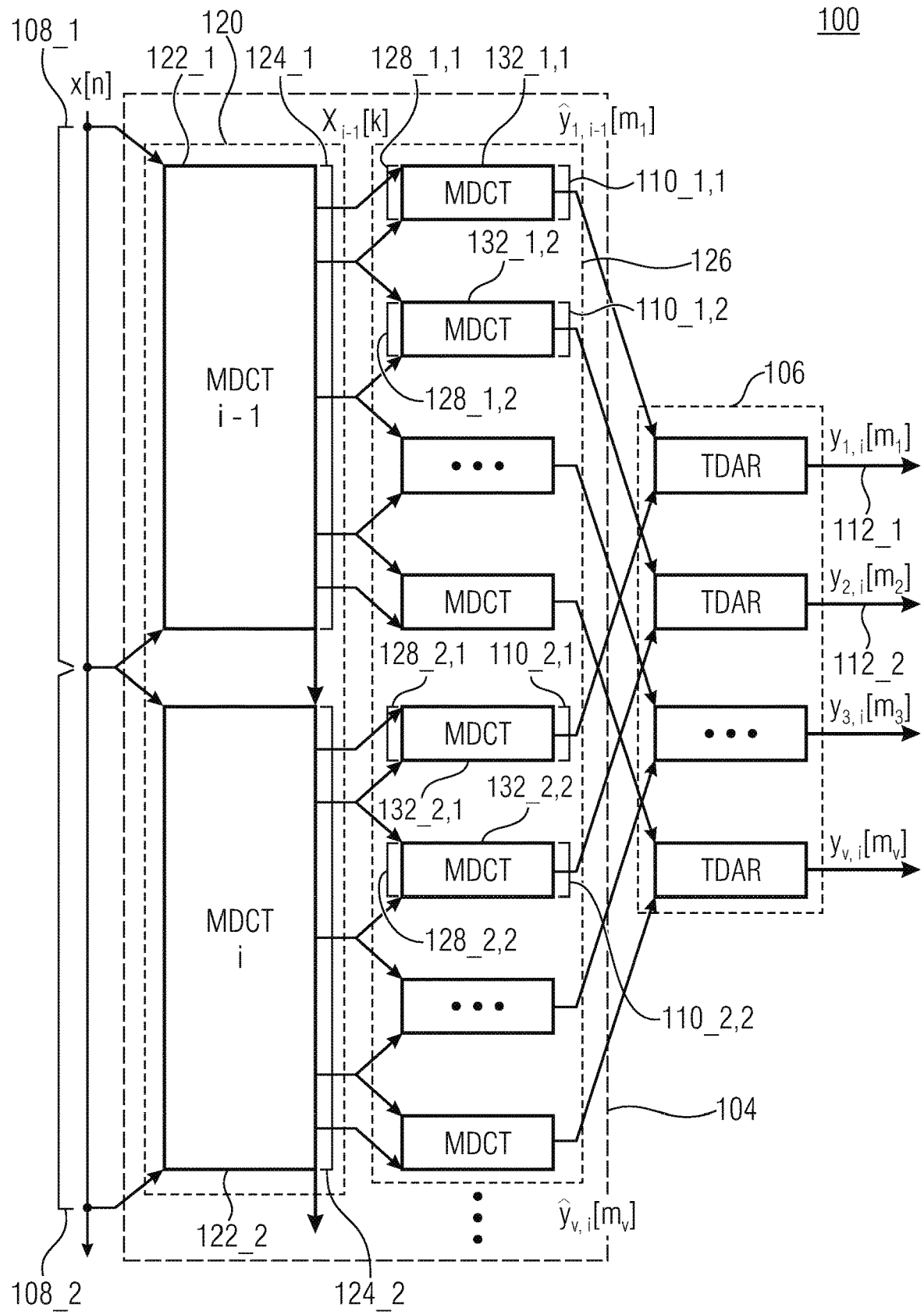
FIG. 3 shows a schematic block diagram of an audio processor configured to process an audio signal to obtain a subband representation of the audio signal, according to a further embodiment.

FIG. 3 shows a schematic block diagram of an audio processor 100 configured to process an audio signal 102 to obtain a subband representation of the audio signal, according to a further embodiment. In other words, FIG. 3 shows a diagram of the analysis filterbank. Thereby, appropriate window functions are assumed. Observe that for simplicity reasons in FIG. 3 (only) the processing of a first half of a subband frame (y[m], 0<=m<N/2) (i.e. only the first line of equation (6)) is indicated.

As shown in FIG. 3, the first lapped critically sampled transform stage 120 can be configured to perform a first lapped critically sampled transform 122_1 (e.g., MDCT i-1) on the first block 108_1 of (2M) samples ($x_{i-1}(n)$, $0 \leq n \leq 2M-1$), to obtain the first set 124_1 of (M) bins (LCST coefficients) ($X_{i-1}(k)$, $0 \leq k \leq M-1$) for the first block 108_1 of samples, and to perform a second lapped critically sampled transform 122_2 (e.g., MDCT i) on the second block 108_2 of (2M) samples ($x_i(n)$, $0 \leq n \leq 2M-1$), to obtain a second set 124_2 of (M) bins (LCST coefficients) (Xi(k), $0 \leq k \leq M-1$) for the second block 108_2 of samples.

In detail, the second lapped critically sampled transform stage 126 can be configured to perform lapped critically sampled transforms on at least two partially overlapping segments 128_1,1 and 128_1,2 (proper subsets) ($X_{v,i-1}(k)$) of the first set 124_1 of bins and to perform lapped critically sampled transforms on at least two partially overlapping segments 128_2,1 and 128_2,2 (proper subsets) ($X_{v,i}(k)$) of the second set of bins, each segment being associated with a subband of the audio signal, to obtain at least two sets 110_1,1 and 110_1,2 of subband samples ($\hat{y}_{v,i-1}(m)$) for the first set 124_1 of bins and at least two sets 110_2,1 and 110_2,2 of subband samples ($\hat{y}_{v,i}(m)$) for the second set 124_2 of bins.

For example, the first set 110_1,1 of subband samples can be a result of a first lapped critically sampled transform 132_1,1 on the basis of the first segment 132_1,1 of the first set 124_1 of bins, wherein the second set 110_1,2 of subband samples can be a result of a second lapped critically sampled 132_1,2 transform on the basis of the second segment 128_1,2 of the first set 124_1 of bins, wherein the third set 110_2,1 of subband samples can be a result of a third lapped critically sampled transform 132_2,1 on the basis of the first segment 128_2,1 of the second set 124_2 of bins, wherein the fourth set 110_2,2 of subband samples can be a result of a fourth lapped critically sampled transform 132_2,2 on the basis of the second segment 128_2,2 of the second set 124_2 of bins.

Thereby, the time domain aliasing reduction stage 106 can be configured to perform a weighted combination of the first set 110_1,1 of subband samples and the third set 110_2,1 of subband samples, to obtain a first aliasing reduced subband representation 112_1 ($y_{1,i}[m_1]$) of the audio signal, wherein the domain aliasing reduction stage 106 can be configured to perform a weighted combination of the second set 110_1,2 of subband samples and the fourth set 110_2,2 of subband samples, to obtain a second aliasing reduced subband representation 112_2 ($y_{2,i}[m_2]$) of the audio signal.

Figure 4:
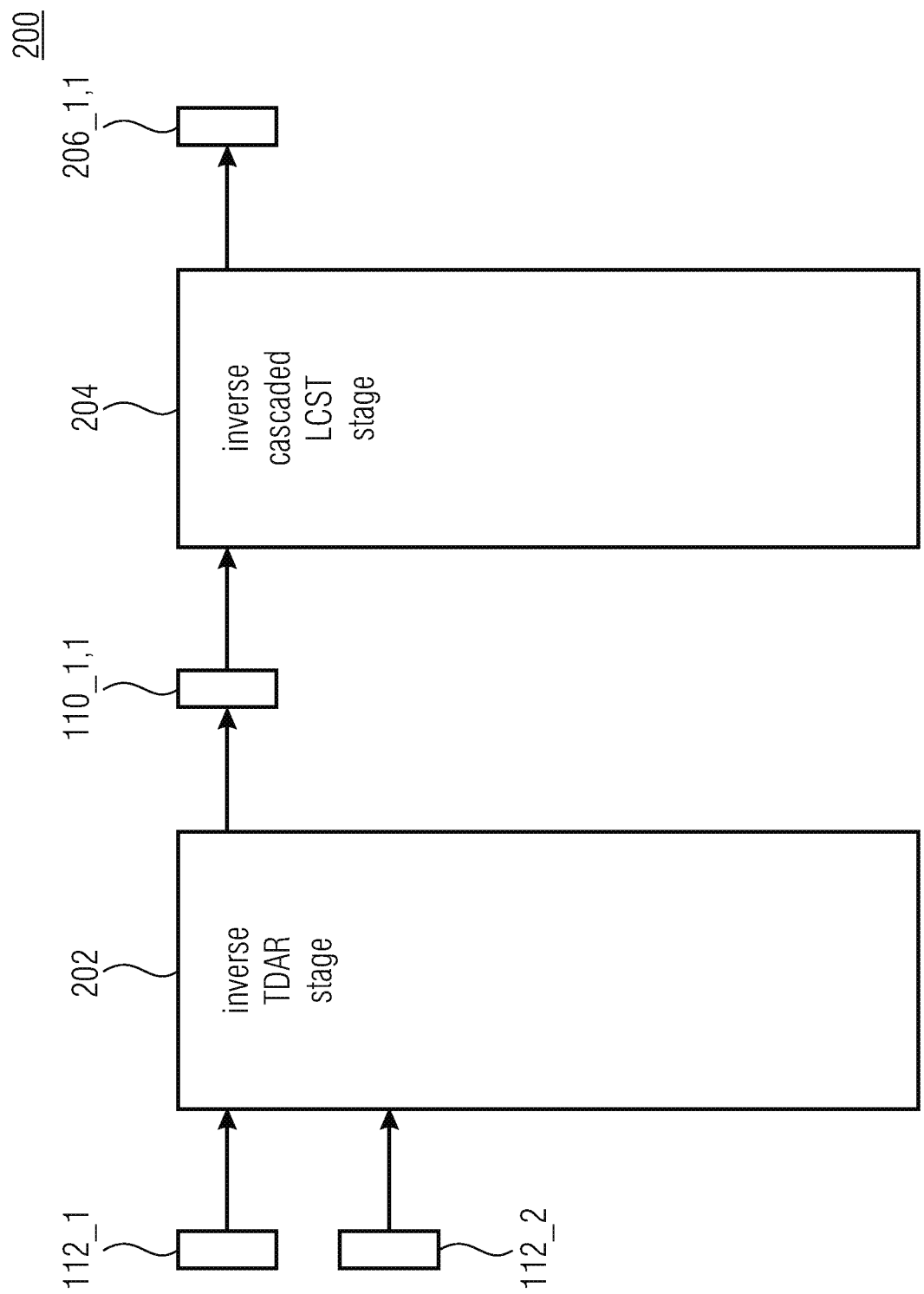
FIG. 4 shows a schematic block diagram of an audio processor for processing a subband representation of an audio signal to obtain the audio signal, according to an embodiment.

FIG. 4 shows a schematic block diagram of an audio processor 200 for processing a subband representation of an audio signal to obtain the audio signal 102, according to an embodiment. The audio processor 200 comprises an inverse time domain aliasing reduction (TDAR) stage 202 and a cascaded inverse lapped critically sampled transform (LCST) stage 204.

The inverse time domain aliasing reduction stage 202 is configured to perform a weighted (and shifted) combination of two corresponding aliasing reduced subband representations 112_1 and 112_2 ($y_{v,i}(m)$, $y_{v,i-1}(m)$) of the audio signal 102, to obtain an aliased subband representation 110_1 ($\hat{y}_{v,i}(m)$), wherein the aliased subband representation is a set 110_1 of subband samples.

The cascaded inverse lapped critically sampled transform stage 204 is configured to perform a cascaded inverse lapped critically sampled transform on the set 110_1 of subband samples, to obtain a set of samples associated with a block 108_1 of samples of the audio signal 102.

Figure 5:
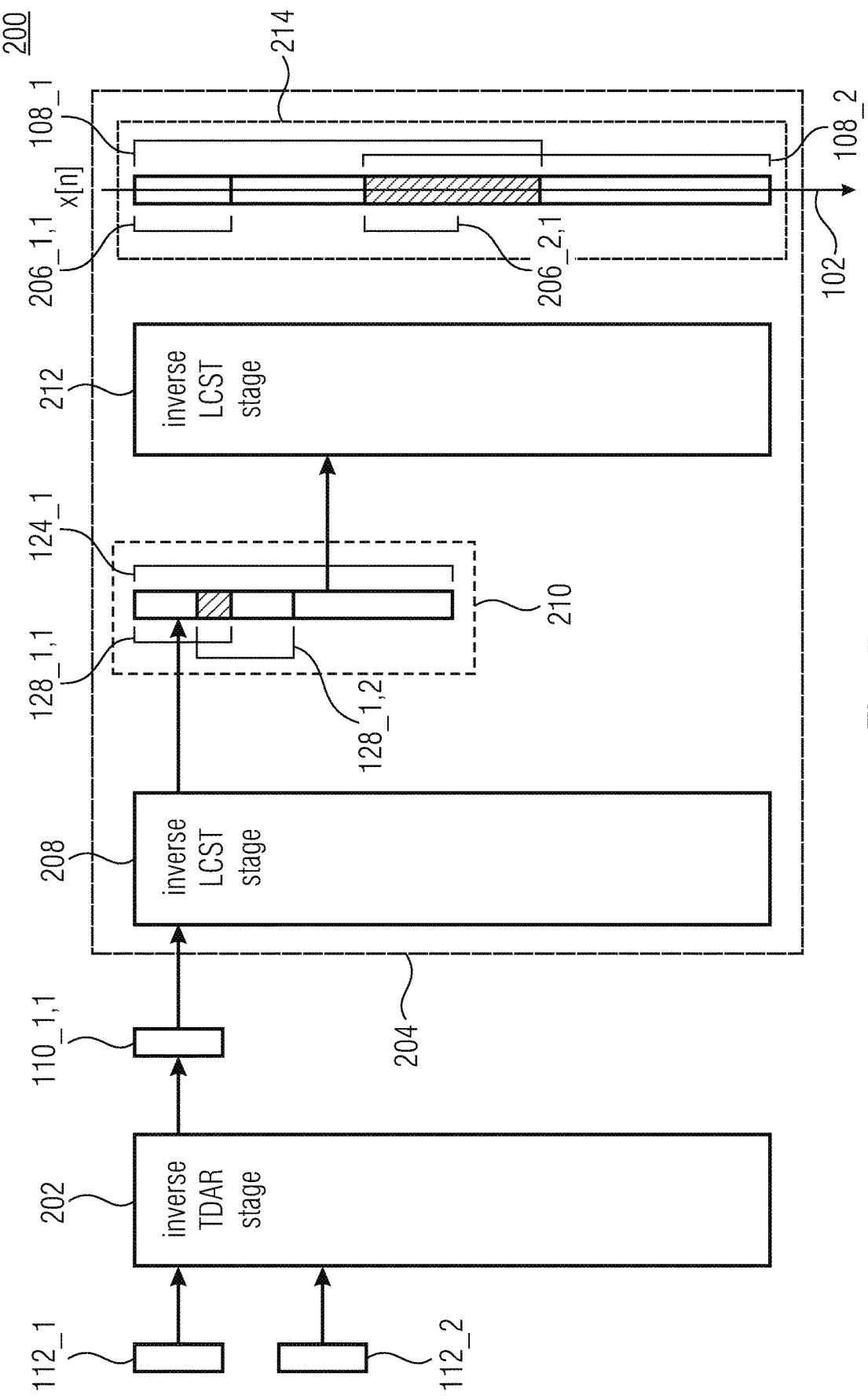
FIG. 5 shows a schematic block diagram of an audio processor for processing a subband representation of an audio signal to obtain the audio signal, according to a further embodiment.

FIG. 5 shows a schematic block diagram of an audio processor 200 for processing a subband representation of an audio signal to obtain the audio signal 102, according to a further embodiment. The cascaded inverse lapped critically sampled transform stage 204 can comprise a first inverse lapped critically sampled transform (LCST) stage 208 and a first overlap and add stage 210.

The first inverse lapped critically sampled transform stage 208 can be configured to perform an inverse lapped critically sampled transform on the set 110_1,1 of subband samples, to obtain a set 128_1,1 of bins associated with a given subband of the audio signal ($\hat{X}v,i(k)$).

The first overlap and add stage 210 can be configured to perform a concatenation of sets of bins associated with a plurality of subbands of the audio signal, which comprises a weighted combination of the set 128_1,1 of bins ($\hat{X}_{v,i}(k)$) associated with the given subband (v) of the audio signal 102 with a set 128_1,2 of bins ($\hat{X}_{v-1,i}(k)$) associated with another subband (v-1) of the audio signal 102, to obtain a set 124_1 of bins associated with a block 108_1 of samples of the audio signal 102.

As shown in FIG. 5, the cascaded inverse lapped critically sampled transform stage 204 can comprise a second inverse lapped critically sampled transform (LCST) stage 212 configured to perform an inverse lapped critically sampled transform on the set 124_1 of bins associated with the block 108_1 of samples of the audio signal 102, to obtain a set 206_1,1 of samples associated with the block 108_1 of samples of the audio signal 102.

Further, the cascaded inverse lapped critically sampled transform stage 204 can comprise a second overlap and add stage 214 configured to overlap and add the set 206-1,1 of samples associated with the block 108_1 of samples of the audio signal 102 and another set 206_2,1 of samples associated with another block 108_2 of samples of the audio signal, the block 108_1 of samples and the another block 108_2 of samples of the audio signal 102 partially overlapping, to obtain the audio signal 102.

Figure 6:
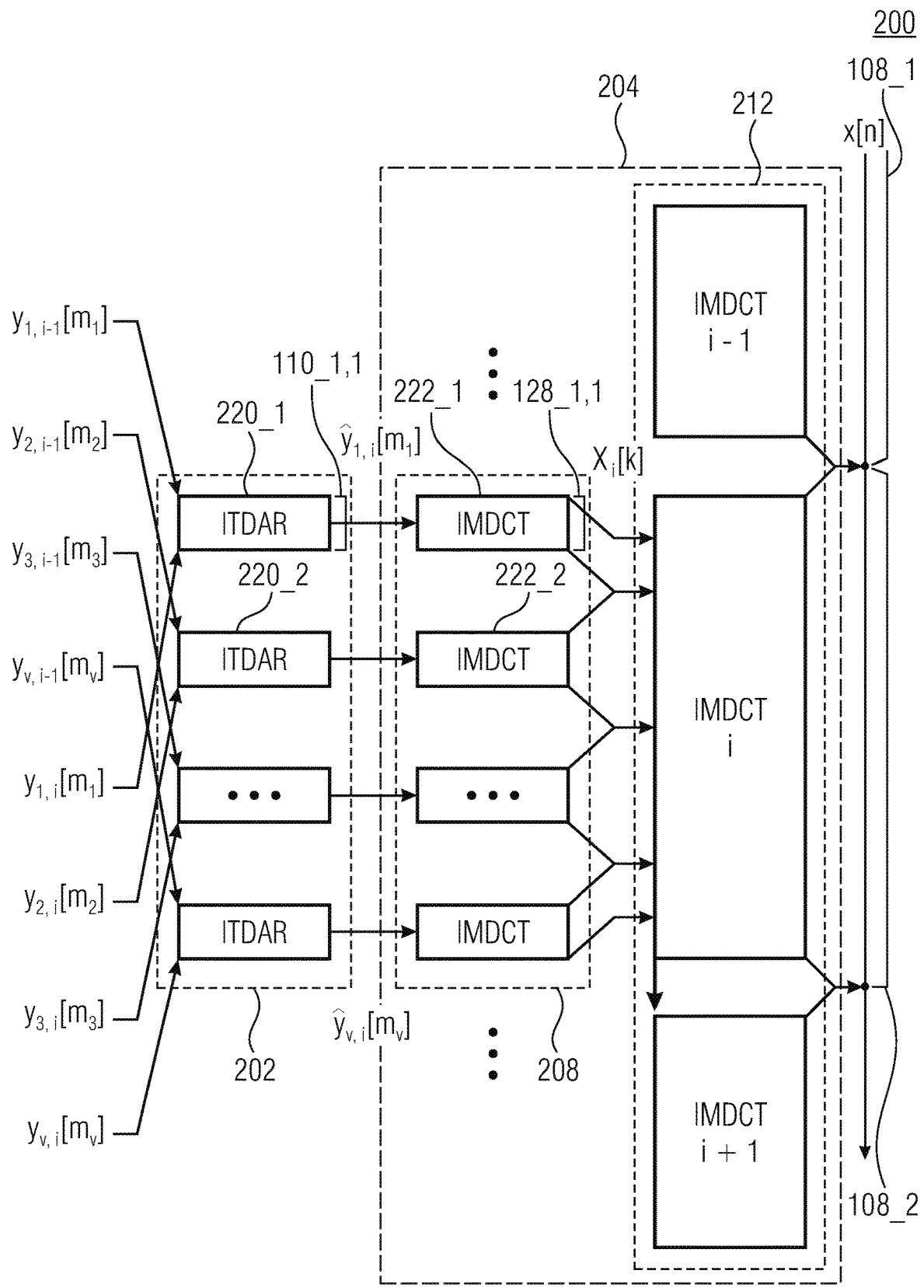
FIG. 6 shows a schematic block diagram of an audio processor for processing a subband representation of an audio signal to obtain the audio signal, according to a further embodiment.

FIG. 6 shows a schematic block diagram of an audio processor 200 for processing a subband representation of an audio signal to obtain the audio signal 102, according to a further embodiment. In other words, FIG. 6 shows a diagram of the synthesis filter bank. Thereby, appropriate windows functions are assumed. Observe that for simplicity reasons in FIG. 6 (only) the processing of a first half of a subband frame (y[m], 0<=m<N/2) (i.e. only the first line of equation (6)) is indicated.

As described above, the audio processor 200 comprises an inverse time domain aliasing reduction stage 202 and an inverse cascades lapped critically sampled stage 204 comprising a first inverse lapped critically sampled stage 208 and a second inverse lapped critically sampled stage 212.

The inverse time domain reduction stage 104 is configured to perform a first weighted and shifted combination 220_1 of a first and second aliasing reduced subband representations $y_{1,i-1}[m_1]$ and $y_{1,i}[m_1]$ to obtain a first aliased subband representation 110_1,1 $\hat{y}_{1,i}[m_1]$, wherein the aliased subband representation is a set of subband samples, and to perform a second weighted and shifted combination 220_2 of a third and fourth aliasing reduced subband representations $y_{2,i-1}[m_1]$ and $y_{2,i}[m_1]$ to obtain a second aliased subband representation 110_2,1 $\hat{y}_{2,i}[m_1]$, wherein the aliased subband representation is a set of subband samples.

The first inverse lapped critically sampled transform stage 208 is configured to perform a first inverse lapped critically sampled transform 222_1 on the first set of subband samples 110_1,1 $\hat{y}_{1,i}[m_1]$ to obtain a set 128_1,1 of bins associated with a given subband of the audio signal ($\hat{X}_{1,1}(k)$), and to perform a second inverse lapped critically sampled transform 222_2 on the second set of subband samples 110_2,1 $\hat{y}_{2,i}[m_1]$ to obtain a set 128_2,1 of bins associated with a given subband of the audio signal ($\hat{X}_{2,1}(k)$).

The second inverse lapped critically sampled transform stage 212 is configured to perform an inverse lapped critically sampled transform on an overlapped and added set of bins obtained by overlapping and adding the sets of bins 128_1,1 and 128_21 provided by the first inverse lapped critically sampled transform stage 208, to obtain the block of samples 108_2.

Subsequently, embodiments of the audio processors shown in FIGS. 1 to 6 are described in which it is exemplarily assumed that the cascaded lapped critically sampled transform stage 104 is a MDCT stage, i.e. the first and second lapped critically sampled transform stages 120 and 126 are MDCT stages, and the inverse cascaded lapped critically sampled transform stage 204 is an inverse cascaded MDCT stage, i.e. the first and second inverse lapped critically sampled transform stages 120 and 126 are inverse MDCT stages. Naturally, the following description is also applicable to other embodiments of the cascaded lapped critically sampled transform stage 104 and inverse lapped critically sampled transform stage 204, such as to a cascaded MDST or MLT stage or an inverse cascaded MDST or MLT stage.

Thereby, the described embodiments may work on a sequence of MDCT spectra of limited length and use MDCT and time domain aliasing reduction (TDAR) as the subband merging operation. The resulting non-uniform filterbank is lapped, orthogonal and allows for subband widths k=2n with n∈N. Due to TDAR, a both temporally and spectral more compact subband impulse response can be achieved.

Subsequently, embodiments of the filterbank are described.

The filterbank implementation directly builds upon common lapped MDCT transformation schemes: The original transform with overlap and windowing remains unchanged.

Without loss of generality the following notation assumes orthogonal MDCT transforms, e.g. where analysis and synthesis windows are identical.

$$x_i(n) = x(n + iM) \; 0 \leq n \leq 2M \quad (1)$$

$$X_i(k) = \sqrt{\frac{2}{M}} \sum_{n=0}^{2M-1} h(n) x_i(n) \kappa(k, n, M) \; 0 \leq k < M \quad (2)$$

where k(k, n, M) is the MDCT transform kernel and h(n) a suitable analysis window $$\kappa(k, n, M) = \cos\left[\frac{\pi}{M}\left(k + \frac{1}{2}\right)\left(n + \frac{M+1}{2}\right)\right]. \quad (3)$$

The output of this transform $X_i(k)$ is then segmented into υ subbands of individual widths $N_v$ and transformed again using MDCT. This results in a filterbank with overlap in both temporal and spectral direction.

For sake of simpler notation herein one common merge factor N for all subbands is used, however any valid MDCT window switching/sequencing can be used to implement the desired time-frequency resolution. More on resolution design below.

$$X_{v,i}(k) = X_i(k + vN) \; 0 \leq k < 2N \quad (4)$$

$$\hat{y}_{v,i}(m) = \sqrt{\frac{2}{N}} \sum_{k=0}^{2N-1} w(k) X_{v,i}(k) \kappa(m, k, N) \; 0 \leq m < N \quad (5)$$

where w(k) is a suitable analysis window and generally differs from h(n) in size and may differ in window type. Since embodiments apply the window in the frequency domain it is noteworthy though that time- and frequency-selectivity of the window are swapped.

For proper border handling an additional offset of N/2 can be introduced in equation (4), combined with rectangular start/stop window halves at the borders. Again for sake of simpler notation this offset has not been taken into account here.

The output $\hat{y}_{v,i}(m)$ is a list of v vectors of individual lengths $N_v$ of coefficients with corresponding bandwidths $$\pi \frac{N_v}{M}$$

and a temporal resolution proportional to that bandwidth.

These vectors however contain aliasing from the original MDCT transform and consequently show poor temporal compactness. To compensate this aliasing TDAR may be facilitated.

The samples used for TDAR are taken from the two adjacent subband sample blocks v in the current and previous MDCT frame i and i-1. The result is reduced aliasing in the second half of the previous frame and the first half of the second frame.

$$\begin{bmatrix} y_{v,i}(m) \\ y_{v,i-1}(N-1-m) \end{bmatrix} = A \begin{bmatrix} \hat{y}_{v,i}(m) \\ \hat{y}_{v,i-1}(N-1-m) \end{bmatrix} \quad (6)$$

for $0 \leq m < N/2$ with $$A = \begin{bmatrix} a_v(m) & b_v(m) \\ c_v(m) & d_v(m) \end{bmatrix} \quad (7)$$

The TDAR coefficients $a_v(m)$, $b_v(m)$, $c_v(m)$ and $d_v(m)$ can be designed to minimize residual aliasing. A simple estimation method based on the synthesis window g(n) will be introduced below.

Also note that if A is nonsingular the operations (6) and (8) correspond to a biorthogonal system. Additionally if g(n)=h(n) and v(k)=w(k), e.g. both MDCTs are orthogonal, and matrix A is orthogonal the overall pipeline constitutes an orthogonal transform.

To calculate the inverse transform, first inverse TDAR is performed, $$\begin{bmatrix} \hat{y}_{v,i}(m) \\ \hat{y}_{v,i-1}(N-1-m) \end{bmatrix} = A^{-1} \begin{bmatrix} y_{v,i}(m) \\ y_{v,i-1}(N-1-m) \end{bmatrix} \quad (8)$$

followed by inverse MDCT and time domain aliasing cancellation (TDAC, albeit the aliasing cancellation is done along the frequency axis here) is performed to cancel the aliasing produced in Equation 5

$$\hat{X}_{v,i}(k) = \sqrt{\frac{2}{N}} \sum_{m=0}^{N-1} \hat{y}_{v,i}(m) \kappa(k, m, N) \; 0 \leq k < 2N \quad (9)$$

$$X_{v,i}(k) = v(k + N) \hat{X}_{v-1,i}(k + N) + v(k) \hat{X}_{v,i}(k) \quad (10)$$

$$X_i(k + vN) = X_{v,i}(k). \quad (11)$$

Finally, the initial MDCT in Equation 2 is inverted and again TDAC is performed $$\hat{x}_i(n) = \sqrt{\frac{2}{N}} \sum_{k=0}^{M-1} X_i(k) \kappa(n, k, M) \; 0 \leq n < 2M \quad (12)$$

-continued $$x_i(n) = g(n+M)\hat{x}_{i-1}(n+M) + g(n)\hat{x}_i(n) \quad (13)$$

$$x(n+iM) = x_i(n) \quad (14)$$

Subsequently, time-frequency resolution design limitations are described. While any desired time-frequency resolution is possible, some constraints for designing the resulting window functions will be adhered to to ensure invertibility. In particular, the slopes of two adjacent subbands can be symmetric so that Equation (6) fulfills the Princen Bradley condition [J. Princen, A. Johnson, and A. Bradley, "Subband/transform coding using filter bank designs based on time domain aliasing cancellation," in Acoustics, Speech, and Signal Processing, IEEE International Conference on ICASSP '87., April 1987, vol. 12, pp. 2161-2164]. The window switching scheme as introduced in [B. Edler, "Codierung von Audiosignalen mit überlappender Transformation und adaptiven Fensterfunktionen," Frequenz, vol. 43, pp. 252-256, September 1989], originally designed to combat pre-echo effects, can be applied here. See [Olivier Derrien, Thibaud Necciari, and Peter Balazs, "A quasi-orthogonal, invertible, and perceptually relevant time-frequency transform for audio coding," in EUSIPCO, Nice, France, August 2015.].

Secondly, the sum of all second MDCT transform lengths adds up to the total length of provided MDCT coefficients. Bands may be chosen not to be transformed using a unit step window with zeros at the desired coefficients. The symmetry properties of the neighboring windows will be taken care of, through [B. Edler, "Codierung von Audiosignalen mit überlappender Transformation und adaptiven Fensterfunktionen," Frequenz, vol. 43, pp. 252-256, September 1989.]. The resulting transform will yield zeros in these bands so the original coefficients may be directly used.

As a possible time-frequency resolution scalefactor bands from most modern audio coders may directly be used.

Subsequently, the time domain aliasing reduction (TDAR) coefficients calculation is described.

Following the aforementioned temporal resolution, each subband sample corresponds to $M/N_v$ original samples, or an interval $N_v$ times the size as the one of an original sample.

Furthermore the amount of aliasing in each subband sample depends on the amount of aliasing in the interval it is representing. As the aliasing is weighted with the analysis window h(n) using an approximate value of the synthesis window at each subband sample interval is assumed to be a good first estimate for a TDAR coefficient.

Experiments have shown that two very simple coefficient calculation schemes allow for good initial values with improved both temporal and spectral compactness. Both methods are based on a hypothetical synthesis window $g_v(m)$ of length $2N_v$.

1) For parametric windows like Sine or Kaiser Bessel Derived a simple, shorter window of the same type can be defined.

2) For both parametric and tabulated windows with no closed representation the window may be simply cut into $2N_v$ sections of equal size, allowing coefficients to be obtained using the mean value of each section:

$$g_v(m) = \frac{1}{N_v/M} \sum_{n=1}^{N_v/M} g(mN_v/M + n) \quad 0 \le m < 2N_v \quad (15)$$

Taking the MDCT boundary conditions and aliasing mirroring into account this then yields TDAR coefficients $$a_v(m) = g_v(N/2+m) \quad (16)$$

$$b_v(m) = -g_v(N/2-1-m) \quad (17)$$

$$c_v(m) = g_v(3N/2+m) \quad (18)$$

$$d_v(m) = g_v(3N/2-1-m) \quad (19)$$

or in case of an orthogonal transform $$a_v(m) = d_v(m) = g_v(N/2+m) \quad (20)$$

$$-b_v(m) = c_v(m) = \sqrt{1 - a_v(m)^2}. \quad (21)$$

Whatever coefficient approximation solution was chosen, as long as A is nonsingular perfect reconstruction of the entire filterbank is preserved. An otherwise suboptimal coefficient selection will only affect the amount of residual aliasing in the subband signal $y_{v,i}(m)$, however not in the signal x(n) synthesized by the inverse filterbank.

Figure 7:
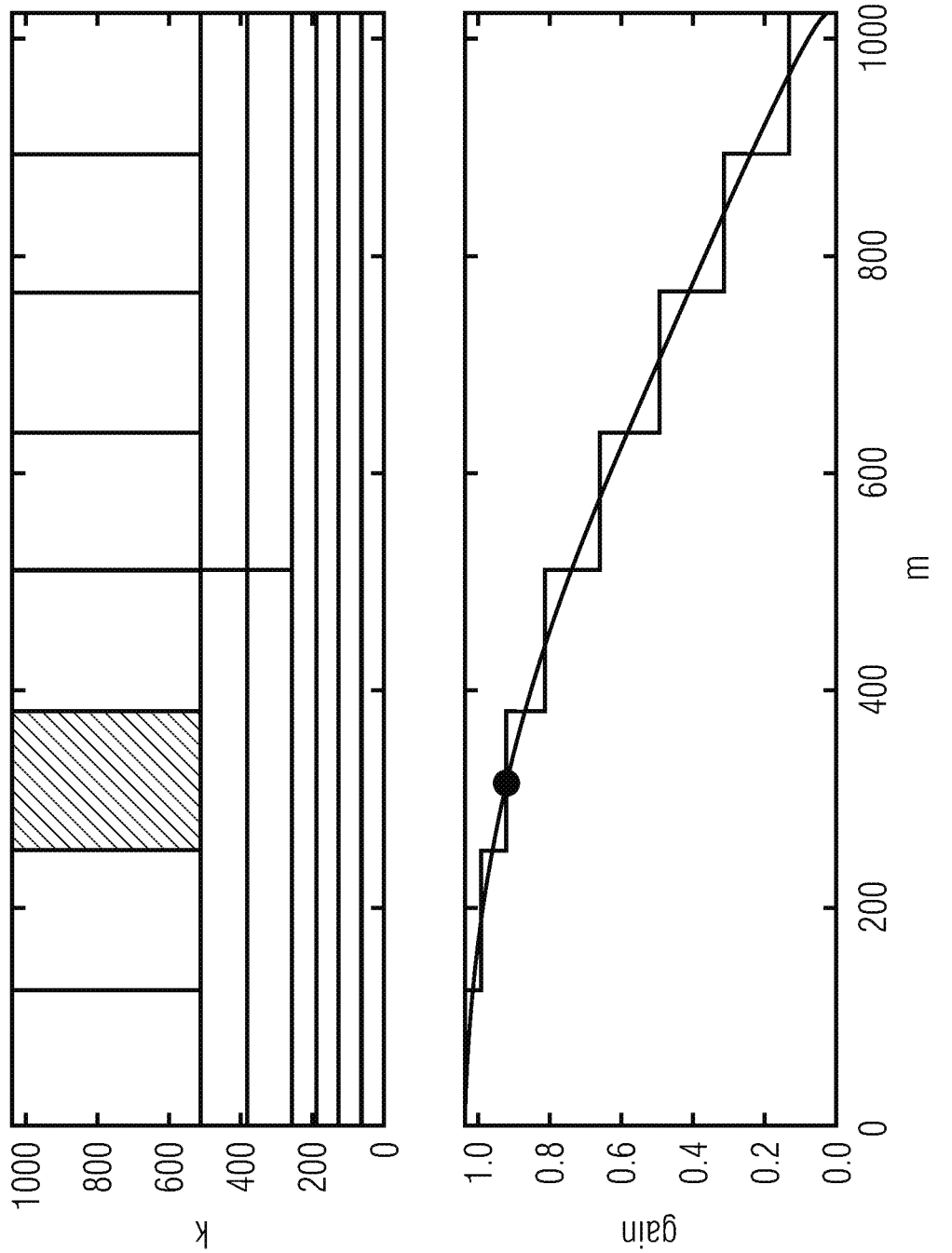
FIG. 7 shows in diagrams an example of subband samples (top graph) and the spread of their samples over time and frequency (below graph)

FIG. 7 shows in diagrams an example of subband samples (top graph) and the spread of their samples over time and frequency (below graph). The annotated sample has wider bandwidth but a shorter time spread than the bottom samples. The analysis windows (bottom graph) have a full resolution of one coefficient per original time sample. The TDAR coefficients thus will be approximated (annotated by a dot) for each subband samples' time region (m=256 : : : 384).

Subsequently, (simulation) results are described.

Figure 8:
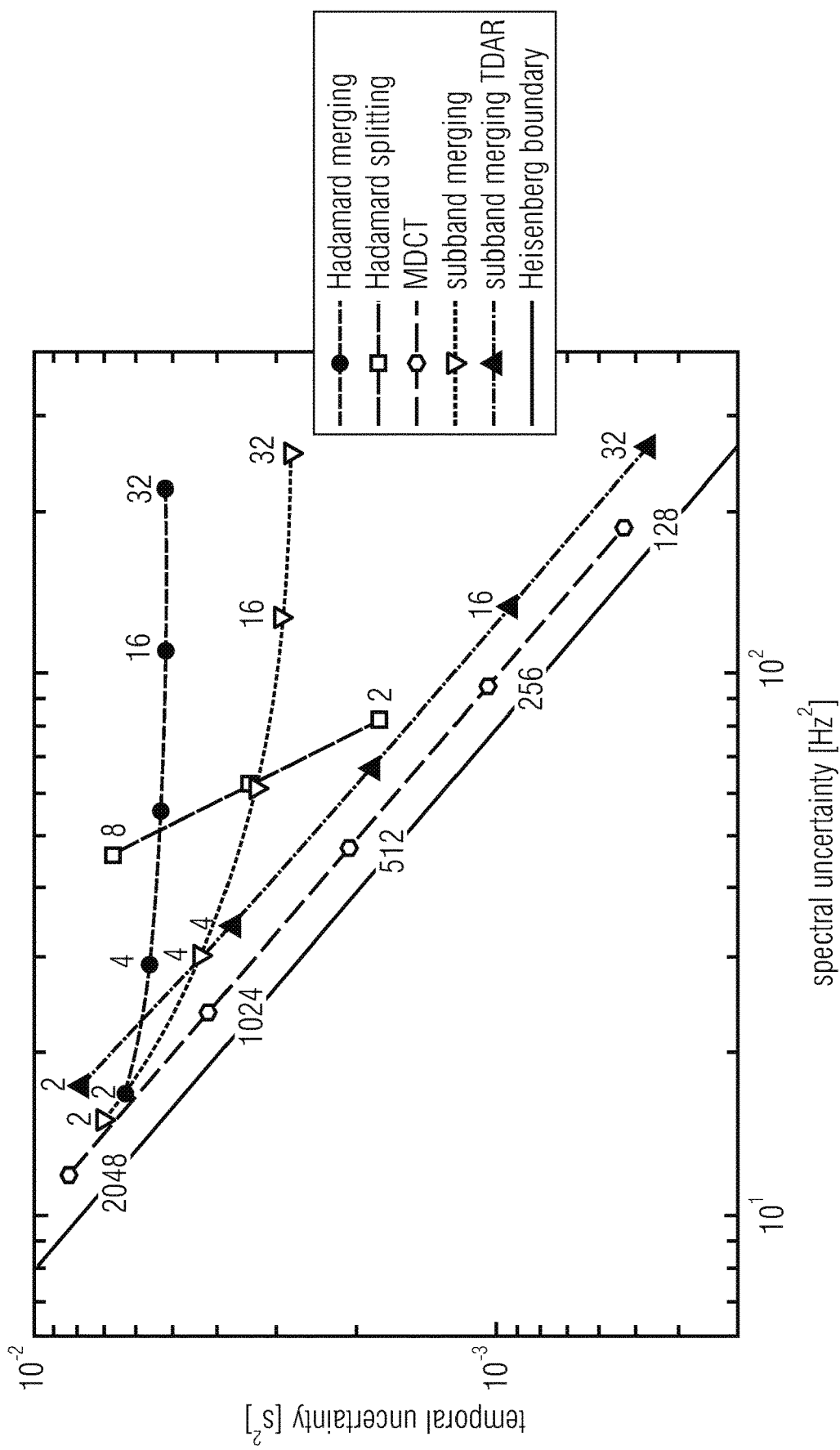
FIG. 8 shows in a diagram the spectral and temporal uncertainty obtained by several different transforms.

FIG. 8 shows the spectral and temporal uncertainty obtained by several different transforms, as shown in [Frederic Bimbot, Ewen Camberlein, and Pierrick Philippe, "Adaptive filter banks using fixed size mdct and subband merging for audio coding-comparison with the mpeg aac filter banks," in Audio Engineering Society Convention 121, October 2006.].

It can be seen that the Hadamard-matrix based transforms offer severely limited time-frequency tradeoff capabilities. For growing merge sizes, additional temporal resolution come at a disproportionally high cost in spectral uncertainty.

In other words, FIG. 8 shows a comparison of spectral and temporal energy compaction of different transforms. Inline labels denote framelengths for MDCT, split factors for Heisenberg Splitting and merge factors for all others.

Subband Merging with TDAR however has a linear tradeoff between temporal and spectral uncertainty, parallel to a plain uniform MDCT. The product of the two is constant, albeit a little bit higher than plain uniform MDCT. For this analysis a Sine analysis window and a Kaiser Bessel Derived subband merging window showed the most compact results and were thusly chosen.

However using TDAR for a merging factor $N_v=2$ seems to decrease both temporal and spectral compactness. We attribute this to the coefficient calculation scheme introduced in Section II-B being too simplistic and not appropriately approximating values for steep window function slopes. A numeric optimization scheme will be presented in a follow-up publication.

These compactness values were calculated using the center of gravity cog and squared effective length $l_{eff}^2$ of the impulse response x[n], defined as [Athanasios Papoulis, Signal analysis, Electrical and electronic engineering series. McGraw-Hill, New York, San Francisco, Paris, 1977.]

$$cogx = \frac{\sum_{n=1}^{N}|x[n]|^2 n^2}{\sum_{n=1}^{N}|x[n]|^2} \quad (22)$$

$$l_{eff}^2 x = \frac{\sum_{n=1}^{N}|x[n]|^2(n-cogx)^2}{\sum_{n=1}^{N}|x[n]|^2} \quad (23)$$

Shown are the average values of all impulse responses of each individual filterbank.

Figure 9:
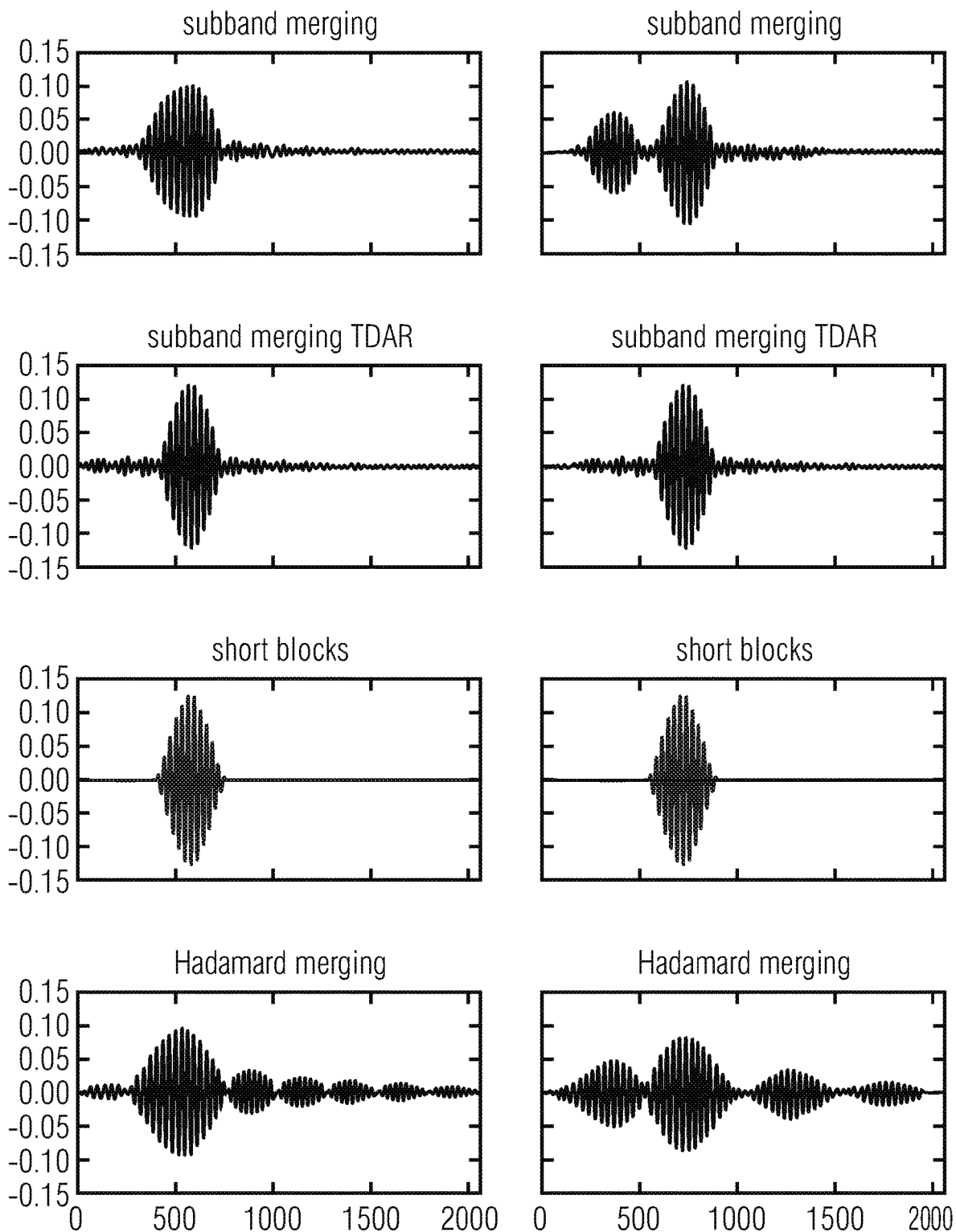
FIG. 9 shows in diagrams shows a comparison of two exemplary impulse responses generated by subband merging with and without TDAR, simple MDCT shortblocks and Hadamard matrix subband merging.

FIG. 9 shows a comparison of two exemplary impulse responses generated by subband merging with and without TDAR, simple MDCT shortblocks and Hadamard matrix subband merging as proposed in [O. A. Niamut and R. Heusdens, "Flexible frequency decompositions for cosine-modulated filter banks," in Acoustics, Speech, and Signal Processing, 2003. Proceedings. (ICASSP '03). 2003 IEEE International Conference on, April 2003, vol. 5, pp. V-449-52 vol. 5.].

The poor temporal compactness of the Hadamard matrix merging transform is clearly visible. Also it can clearly be seen that most of the aliasing artifacts in the subband are significantly reduced by TDAR.

In other words, FIG. 9 shows an exemplary impulse responses of a merged subband filter comprising 8 of 1024 original bins using the method proposed here without TDAR, with TDAR, the method proposed in [O. A. Niamut and R. Heusdens, "Subband merging in cosine-modulated filter banks," Signal Processing Letters, IEEE, vol. 10, no. 4, pp. 111-114, April 2003.] and using a shorter MDCT framelength of 256 samples.

FIG. 10 shows a flowchart of a method 300 for processing an audio signal to obtain a subband representation of the audio signal. The method 300 comprises a step 302 of performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. Further, the method 300 comprises a step 304 of performing a weighted combination of two corresponding sets of subband samples, one obtained on the basis of the first block of samples of the audio signal and one obtained on the basis on the second block of samples of the audio signal, to obtain an aliasing reduced subband representation of the audio signal.

FIG. 11 shows a flowchart of a method 400 for processing a subband representation of an audio signal to obtain the audio signal. The method 400 comprises a step 402 of performing a weighted (and shifted) combination of two corresponding aliasing reduced subband representations (of different blocks of partially overlapping samples) of the audio signal, to obtain an aliased subband representation, wherein the aliased subband representation is a set of subband samples. Further, the method 400 comprises a step 404 of performing a cascaded inverse lapped critically sampled transform on the set of subband samples, to obtain a set of samples associated with a block of samples of the audio signal.

Figure 12:
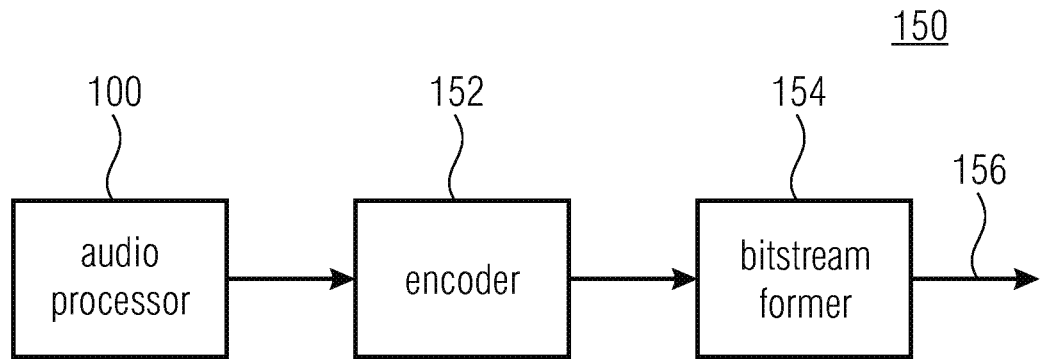
FIG. 12 shows a schematic block diagram of an audio encoder, according to an embodiment.

FIG. 12 shows a schematic block diagram of an audio encoder 150, according to an embodiment. The audio encoder 150 comprises an audio processor (100) as described above, an encoder 152 configured to encode the aliasing reduced subband representation of the audio signal, to obtain an encoded aliasing reduced subband representation of the audio signal, and a bitstream former 154 configured to form a bitstream 156 from the encoded aliasing reduced subband representation of the audio signal.

Figure 13:
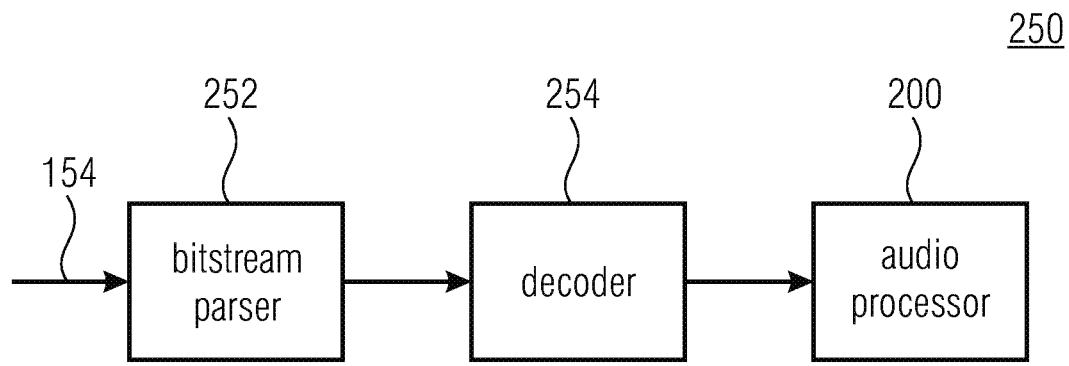
FIG. 13 shows a schematic block diagram of an audio decoder, according to an embodiment.

FIG. 13 shows a schematic block diagram of an audio decoder 250, according to an embodiment. The audio decoder 250 comprises a bitstream parser 252 configured to parse the bitstream 154, to obtain the encoded aliasing reduced subband representation, a decoder 254 configured to decode the encoded aliasing reduced subband representation, to obtain the aliasing reduced subband representation of the audio signal, and an audio processor 200 as described above.

Figure 14:
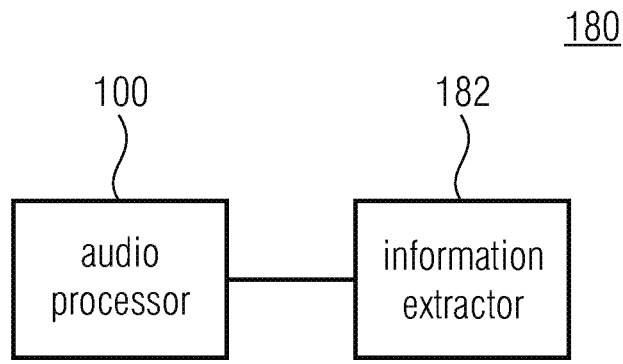
FIG. 14 shows a schematic block diagram of an audio analyzer, according to an embodiment.

FIG. 14 shows a schematic block diagram of an audio analyzer 180, according to an embodiment. The audio analyzer 180 comprises an audio processor 100 as described above, an information extractor 182, configured to analyze the aliasing reduced subband representation, to provide an information describing the audio signal.

Embodiments provide time domain aliasing reduction (TDAR) in subbands of non-uniform orthogonal modified discrete cosine transform (MDCT) filterbanks.

Embodiments add an additional post-processing step to the widely used MDCT transform pipeline, the step itself comprising only another lapped MDCT transform along the frequency axis and time domain aliasing reduction (TDAR) along each subband time axis, allowing to extract arbitrary frequency scales from the MDCT spectrogram with an improved temporal compactness of the impulse response, while introducing no additional redundancy and only one MDCT frame delay.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio processor for processing an audio signal to acquire a subband representation of the audio signal, the audio processor comprising:
   a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and
   a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;
   wherein the cascaded lapped critically sampled transform stage comprises a first lapped critically sampled transform stage configured to perform lapped critically sampled transforms on a first block of samples and a second block of samples of the at least two partially overlapping blocks of samples of the audio signal, to acquire a first set of bins for the first block of samples and a second set of bins for the second block of samples;
   wherein the cascaded lapped critically sampled transform stage further comprises a second lapped critically sampled transform stage configured to perform a lapped critically sampled transform on a segment of the first set of bins and to perform a lapped critically sampled transform on a segment of the second set of bins, each segment being associated with a subband of the audio signal, to acquire a set of subband samples for the first set of bins and a set of subband samples for the second set of bins;
   wherein a first set of subband samples is a result of a first lapped critically sampled transform on the basis of the first segment of the first set of bins, wherein a second set of subband samples is a result of a second lapped critically sampled transform on the basis of the second segment of the first set of bins, wherein a third set of subband samples is a result of a third lapped critically sampled transform on the basis of the first segment of the second set of bins, wherein a fourth set of subband samples is a result of a fourth lapped critically sampled transform on the basis of the second segment of the second set of bins; and
   wherein the time domain aliasing reduction stage is configured to perform a weighted combination of the first set of subband samples and the third set of subband samples, to acquire a first aliasing reduced subband representation of the audio signal, wherein the time domain aliasing reduction stage is configured to perform a weighted combination of the second set of subband samples and the fourth set of subband samples, to acquire a second aliasing reduced subband representation of the audio signal.

2. The audio processor according to claim 1, wherein the cascaded lapped critically sampled transform stage is configured to segment a set of bins acquired on the basis of the first block of samples using at least two window functions, and to acquire at least two segmented sets of subband samples based on the segmented set of bins corresponding to the first block of samples;

wherein the cascaded lapped critically sampled transform stage is configured to segment a set of bins acquired on the basis of the second block of samples using the at least two window functions, and to acquire at least two segmented sets of subband samples based on the segmented set of bins corresponding to the second block of samples; and wherein the at least two window functions comprise different window widths.

3. The audio processor according to claim 1, wherein the cascaded lapped critically sampled transform stage is configured to segment a set of bins acquired on the basis of the first block of samples using at least two window functions, and to acquire at least two segmented sets of subband samples based on the segmented set of bins corresponding to the first block of samples;

wherein the cascaded lapped critically sampled transform stage is configured to segment a set of bins acquired on the basis of the second block of samples using the at least two window functions, and to acquire at least two sets of subband samples based on the segmented set of bins corresponding to the second block of samples; and wherein filter slopes of the window functions corresponding to adjacent sets of subband samples are symmetric.

4. The audio processor according to claim 1, wherein the cascaded lapped critically sampled transform stage is configured to segment the samples of the audio signal into the first block of samples and the second block of samples using a first window function;

wherein the lapped critically sampled transform stage is configured to segment a set of bins acquired on the basis of the first block of samples and a set of bins acquired on the basis of the second block of samples using a second window function, to acquire the corresponding subband samples; and wherein the first window function and the second window function comprise different window width.

5. The audio processor according to claim 1, wherein the cascaded lapped critically sampled transform stage is configured to segment the samples of the audio signal into the first block of samples and the second block of samples using a first window function;

wherein the cascaded lapped critically sampled transform stage is configured to segment a set of bins acquired on the basis of the first block of samples and a set of bins acquired on the basis of the second block of samples using a second window function, to acquire the corresponding subband samples; and wherein a window width of the first window function and a window width of the second window function are different from each other, wherein the window width of the first window function and the window width of the second window function differ from each other by a factor different from a power of two.

6. The audio processor according to claim 1, wherein the time domain aliasing reduction stage is configured to perform the weighted combination of two corresponding sets of subband samples according to the following equation $$\begin{bmatrix} y_{v,i}(m) \\ y_{v,i-1}(N-1-m) \end{bmatrix} = A \begin{bmatrix} \hat{y}_{v,i}(m) \\ \hat{y}_{v,i-1}(N-1-m) \end{bmatrix}$$

for $0 \leq m < N/2$ with $$A = \begin{bmatrix} a_v(m) & b_v(m) \\ c_v(m) & d_v(m) \end{bmatrix}$$

to acquire the aliasing reduced subband representation of the audio signal, wherein $y_{v,i}(m)$ is a first aliasing reduced subband representation of the audio signal, $y_{v,i-1}(N-1-m)$ is a second aliasing reduced subband representation of the audio signal, $\hat{y}_{v,i}(m)$ is a set of subband samples on the basis of the second block of samples of the audio signal, $\hat{y}_{v,i-1}(N-1-m)$ is a set of subband samples on the basis of the first block of samples of the audio signal, and $a_v(m)$, $b_v(m)$, $c_v(m)$ and $d_v(m)$ are time domain aliasing reduction coefficients.

7. An audio encoder, comprising:

an audio processor for processing an audio signal to acquire a subband representation of the audio signal, the audio processor comprising:

a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein the cascaded lapped critically sampled transform stage comprises a first lapped critically sampled transform stage configured to perform lapped critically sampled transforms on a first block of samples and a second block of samples of the at least two partially overlapping blocks of samples of the audio signal, to acquire a first set of bins for the first block of samples and a second set of bins for the second block of samples;

wherein the cascaded lapped critically sampled transform stage further comprises a second lapped critically sampled transform stage configured to perform a lapped critically sampled transform on a segment of the first set of bins and to perform a lapped critically sampled transform on a segment of the second set of bins, each segment being associated with a subband of the audio signal, to acquire a set of subband samples for the first set of bins and a set of subband samples for the second set of bins;

wherein a first set of subband samples is a result of a first lapped critically sampled transform on the basis of the first segment of the first set of bins, wherein a second set of subband samples is a result of a second lapped critically sampled transform on the basis of the second segment of the first set of bins, wherein a third set of subband samples is a result of a third lapped critically sampled transform on the basis of the first segment of the second set of bins, wherein a fourth set of subband samples is a result of a fourth lapped critically sampled transform on the basis of the second segment of the second set of bins; and wherein the time domain aliasing reduction stage is configured to perform a weighted combination of the first set of subband samples and the third set of subband samples, to acquire a first aliasing reduced subband representation of the audio signal, wherein the time domain aliasing reduction stage is configured to perform a weighted combination of the second set of subband samples and the fourth set of subband samples, to acquire a second aliasing reduced subband representation of the audio signal, an encoder configured to encode the aliasing reduced subband representation of the audio signal, to acquire an encoded aliasing reduced subband representation of the audio signal; and a bitstream former configured to form a bitstream from the encoded aliasing reduced subband representation of the audio signal.

8. An audio analyzer, comprising:

an audio processor for processing an audio signal to acquire a subband representation of the audio signal, the audio processor comprising:

a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein the cascaded lapped critically sampled transform stage comprises a first lapped critically sampled transform stage configured to perform lapped critically sampled transforms on a first block of samples and a second block of samples of the at least two partially overlapping blocks of samples of the audio signal, to acquire a first set of bins for the first block of samples and a second set of bins for the second block of samples;

wherein the cascaded lapped critically sampled transform stage further comprises a second lapped critically sampled transform stage configured to perform a lapped critically sampled transform on a segment of the first set of bins and to perform a lapped critically sampled transform on a segment of the second set of bins, each segment being associated with a subband of the audio signal, to acquire a set of subband samples for the first set of bins and a set of subband samples for the second set of bins;

wherein a first set of subband samples is a result of a first lapped critically sampled transform on the basis of the first segment of the first set of bins, wherein a second set of subband samples is a result of a second lapped critically sampled transform on the basis of the second segment of the first set of bins, wherein a third set of subband samples is a result of a third lapped critically sampled transform on the basis of the first segment of the second set of bins, wherein a fourth set of subband samples is a result of a fourth lapped critically sampled transform on the basis of the second segment of the second set of bins; and wherein the time domain aliasing reduction stage is configured to perform a weighted combination of the first set of subband samples and the third set of subband samples, to acquire a first aliasing reduced subband representation of the audio signal, wherein the time domain aliasing reduction stage is configured to perform a weighted combination of the second set of subband samples and the fourth set of subband samples, to acquire a second aliasing reduced subband representation of the audio signal; and an information extractor, configured to analyze the aliasing reduced subband representation, to provide an information describing the audio signal.

9. A method for processing an audio signal to acquire a subband representation of the audio signal, the method comprising:

performing a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and performing a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein performing the cascaded lapped critically sampled transform comprises performing lapped critically sampled transforms on a first block of samples and a second block of samples of the at least two partially overlapping blocks of samples of the audio signal, to acquire a first set of bins for the first block of samples and a second set of bins for the second block of samples;

wherein performing the cascaded lapped critically sampled transform comprises performing a lapped critically sampled transform on a segment of the first set of bins and performing a lapped critically sampled transform on a segment of the second set of bins, each segment being associated with a subband of the audio signal, to acquire a set of subband samples for the first set of bins and a set of subband samples for the second set of bins;

wherein a first set of subband samples is a result of a first lapped critically sampled transform on the basis of the first segment of the first set of bins, wherein a second set of subband samples is a result of a second lapped critically sampled transform on the basis of the second segment of the first set of bins, wherein a third set of subband samples is a result of a third lapped critically sampled transform on the basis of the first segment of the second set of bins, wherein a fourth set of subband samples is a result of a fourth lapped critically sampled transform on the basis of the second segment of the second set of bins; and wherein performing the weighted combination of two corresponding sets of subband samples comprises performing a weighted combination of the first set of subband samples and the third set of subband samples, to acquire a first aliasing reduced subband representation of the audio signal, wherein the time domain aliasing reduction stage is configured to perform a weighted combination of the second set of subband samples and the fourth set of subband samples, to acquire a second aliasing reduced subband representation of the audio signal.

10. A non-transitory digital storage medium having a computer program stored thereon to perform the method of claim 9, when said computer program is run by a computer.

\* \* \* \* \*